Patented Aug. 25, 1925.

1,551,201

UNITED STATES PATENT OFFICE.

KARL P. McELROY, OF WASHINGTON, DISTRICT OF COLUMBIA, ASSIGNOR TO ALLEN S. DAVISON COMPANY, OF PITTSBURGH, PENNSYLVANIA, A CORPORATION OF PENNSYLVANIA.

REFRACTORY AND METHOD OF MAKING THE SAME.

No Drawing.   Application filed June 10, 1922.  Serial No. 567,421.

*To all whom it may concern:*

Be it known that I, KARL P. McELROY, a citizen of the United States, residing at Washington, in the District of Columbia, have invented certain new and useful Improvements in Refractories and Methods of Making the Same, of which the following is a specification.

This invention relates to refractories and methods of making the same; and it comprises an aggregate of self-sealed, calcined dolomite independent granules, said granules being thoroughly shrunk and condensed and having a localized concentration at or near their surfaces of the natural accessory constituents of the dolomite; said surfaces being, because of said concentration, of a somewhat less refractory nature than the body of the granule, having their pores substantially closed and being adapted for a welding union with similar surfaces at the temperatures prevailing in a basic open hearth; and it further comprises a method of making such a refractory material wherein dolomite is crushed, granulated and screened to obtain granules within certain size ranges, finer portions of the screenings being further comminuted to form pulverulent material, this pulverulent material remixed in certain proportions with said sized granules and the admixture so produced fired in a rotary kiln at a temperature sufficient to cause said fine material to be taken up by and incorporated in the surfaces of said granules without sintering the granules together; all as more fully hereinafter set forth and as claimed.

Dolomite and various materials made with the aid of dolomite are largely used in making and repairing bottoms of basic open hearth furnaces. By "dolomite" is commercially understood a magnesian limestone high in magnesia. Other things being equal, the higher the percentage of lime in the stone, the better adapted it is for general purposes. The smaller the proportion of quicklime in the roasted dolomite, the better. The dolomite and dolomite preparations are used in granular form; the bed being made by adding successive layers of granules, usually with more or less basic slag to fill the voids, until it has the desired thickness. Patching and repairing are done by pitching or conveying granular material to the spot of repair until the surface is evened up. Raw or unburnt dolomite, although sometimes used in repairs, is not very favorably regarded in the art because of the shrinkage taking place as it calcines and loses its volatile matter (carbon dioxid). Roasted, or burnt, dolomite is freer of shrinkage difficulties, but, like the raw dolomite, does not bond well. If it be "dead burnt," the shrinkage does not amount to much. Various artificial basic refractories derived from dolomite are much better materials for bottoms and repairs than either raw stone or calcined, even if calcination be carried so far as to thoroughly shrink the lime, as they are self-bonding and furthermore better resist the weather in shipment and storage. Burnt dolomite, like any other form of calcined limestone is apt to slake and break down under the influence of moisture. In this slaking, the contained lime plays more part than the magnesia.

In building the bottom in the manner just described, the refractory is placed in position as a loose granular mass, and in order to secure a dense, mechanically strong bottom, it is necessary that these granules seal, weld, coalesce or bond at their surfaces under the heat of the furnaces. It is however, not desirable that there shall be any material or substantial softening of the granule as a whole. It is therefore a desideratum in this art to produce a granular refractory with grains of a more refractory nature in their interior than on their exterior. In use for patching and lining open hearth furnaces, such grains are highly desirable; it is desirable that the interior, more refractory material of the granule shall be of a character which will not melt, or even soften, at open hearth temperatures (around 3100° F.), and that the exterior shall be of a character which will soften at such a temperature.

Ordinary dolomite rock, even when it is of apparently homogeneous character to the eye, is not of uniform character as regards refractoriness throughout. Some portions are more and some portions are less refractory than the rock, taken as a whole. In crushing dolomite to obtain a granular material for furnace linings, the granules are found to be of a more highly refractory character than the dust or fines accompanying them. This fact is utilized in the present invention.

Dolomite or magnesian limestone, in the present invention, is crushed and screened in accordance with the usual practice, until there is produced a granular dolomite of about the size desired for use as the granular material for the basic open hearth furnaces. The finer material will be considerably less refractory than the coarser granular material from which it has been screened.

I may proceed in any one of a number of ways. In one way, after crushing and screening the dolomite or magnesian limestone to produce the granules of refractory material of the proper size and the dust or fines of less refractory character, I may grind the existing dust or fines to a powder or separate the powder from the fines and use it as it is. Usually I wish for my purposes material of such a fineness that it will all pass through a screen of about 50 mesh. It is a question, however, of securing a fine material of lower refractory value than the coarse material; and the dust-like material I want will be coarser with some rock than with other rock. I then feed the more refractory, larger granules down through a rotary kiln adding at the feed end a proportion of the fines. The temperature of the kiln in its hottest zone is maintained at about 3100° Fahrenheit or above—as hot as the lining of the kiln will stand—and the material of less refractory character is softened and melted to such a degree or liquefied to such a degree that it is taken up by the granules of the more refractory material. No more of the less refractory material is used than will be taken up by the granules of the more refractory, giving a loose mass of protected but unbonded granules. The impregnation of the more refractory material by the less refractory material is heavier on the surface of the granules of more refractory material than in the interior, so that in the interior of the grain the high refractory quality is not materially changed, whereas the surface is provided with a coating or impregnation of less refractory material which will bond in the open hearth furnace and make a good bottom and lining. The granules are not sintered together.

In the present invention, I am taking advantage of the less refractory nature of dolomite fines, as compared with coarser material, using the former as an addition in kilning the latter, thereby producing a protected granulated material without using anything foreign to the dolomite rock.

In some cases where the fines of the desirable lower refractory quality are not sufficient in amount or are too refractory, I may however add additional material from another source; generally material containing more or less iron oxid. Such additional and less refractory material may well be iron ore, mill cinder, basic open hearth slag, silica, or the like, ground to the required degree of fineness, usually to such a degree of fineness that it will pass through a 50 mesh sieve.

In another method of performing my process I may make the granules in either of the above two ways described, but preferably the first—where the fines containing a relatively less refractory material are used for coating and impregnating the grains of the more refractory material—and when such product is made, either as immediately coming from the rotary kiln or later after storage, add an additional coating of a less refractory material, such as that already present or of a similar nature. This may be done by again passing the granules having the described coating or surface impregnation through a rotary kiln in the presence of finely ground material, such as alumina, silica, iron oxid or iron ore, mill scale, or basic open hearth slag. This additional coating may be built up to any degree desired, in fact to the extent necessary to furnish substantially all or the greater part of fusible material necessary in using the lining or bottoms in the basic open hearth furnaces. This second coating or impregnation of the preformed granules may be done in ordinary mixing apparatus, such as tumbling drums or the like, since the additional coating may be made from materials at temperatures considerably lower than the temperature of the first coating or impregnation. Or, I may roast and calcine the dolomite granules in a rotary kiln at such a temperature as will give a hard, dense, shrunk character thereto, and then deliver the hot granulated material into another apparatus where the coating is performed, as in a rotary drum.

However the operation may be performed, it is my object to provide granulated, highly refractory dolomite with an exterior layer or surface or the like of such a character that it will fuse or soften at about the temperature of the open hearth furnace which, for this purpose, may be taken as 3100° F.; and to this end, I tumble or otherwise agitate the granular dolomite at a temperature of about 3100° with a fine material which will sufficiently soften or liquefy at that temperature. In the best embodiment of my invention, this less refractory material, yielding to heat at about 3100° F., is itself dolomite; it is, or includes, the less refractory fines produced in making the granulated refractory dolomite.

The granules produced under the present invention may be of such size as is desired. Generally, however, raw stone granules ranging in size between, say, $\frac{3}{16}$ inch and $\frac{1}{16}$ inch on calcination and shrinking will give me the size granules desired.

The bodies to which the lowered refractoriness of the fines is due are mostly iron oxid, silica and alumina; these bodies occurring in all dolomite.

The exact amount of the fines to be added depends to some extent upon their character and to a large extent upon kiln conditions. Much of the fine material is apt to be carried forward and away by the gases leaving the kiln. Some of this can be caught in a dust housing and returned. But as a general rule, I add between 8 and 15 per cent on the weight of granulated dolomite.

What I claim is:—

1. The process of making composite refractory materials existing as masses of loose granules for basic open hearth furnaces comprising separating from raw refractory material containing less refractory material by crushing and screening the raw material, the less refractory material in a fine form passing the screens and leaving the more refractory material in a granular form, heating the more refractory material in the granular form in the presence of the less refractory material in its fine form to a temperature sufficient to melt and liquefy the material in such fine form so that it impregnates and surface coats the granular material without bonding them together.

2. The process in accordance with claim 1 in which additional less refractory material is added to the fine less refractory material.

3. The process in accordance with claim 1 in which additional less refractory material is added to the first less refractory material after the first less refractory material has coated the grains of the more refractory material.

4. In the manufacture of protected, self-welding dolomite granules for basic open hearth furnaces, the process which comprises agitating granular highly refractory dolomite at the normal furnace temperature with a pulverulent dolomite material sufficiently less refractory at such temperature to permit its being taken up superficially by such granular dolomite.

5. As a new refractory material for basic open hearth linings an aggregate of granules of dolomitic lime of such a nature as to be refractory at such furnace temperatures, each such granule superficially carrying dolomitic material softening at such a temperature.

6. In a basic refractory material, granular fragments of shrunk, burnt dolomite exteriorly provided with a less refractory layer of dolomite material.

In testimony whereof, I have hereunto affixed my signature.

K. P. McELROY.